(12) United States Patent
Zhang

(10) Patent No.: US 12,048,072 B1
(45) Date of Patent: Jul. 23, 2024

(54) SIMPLE HAND WARMER

(71) Applicant: Fan Zhang, Shenzhen (CN)

(72) Inventor: Fan Zhang, Shenzhen (CN)

( * ) Notice: Subject to any disclaimer, the term of this patent is extended or adjusted under 35 U.S.C. 154(b) by 0 days.

(21) Appl. No.: 18/523,350

(22) Filed: Nov. 29, 2023

(30) Foreign Application Priority Data

Nov. 14, 2023 (CN) .......................... 202323083116.X

(51) Int. Cl.
*A61F 7/00* (2006.01)
*F16B 2/20* (2006.01)
*H05B 3/06* (2006.01)

(52) U.S. Cl.
CPC ................ *H05B 3/06* (2013.01); *F16B 2/20* (2013.01)

(58) Field of Classification Search
None
See application file for complete search history.

(56) References Cited

U.S. PATENT DOCUMENTS

| | | | |
|---|---|---|---|
| 3,833,447 A | 9/1974 | Gustafson | |
| 3,873,401 A | 3/1975 | Gustafson | |
| 2024/0122747 A1* | 4/2024 | Zhu | A44B 11/005 |

FOREIGN PATENT DOCUMENTS

| | | | |
|---|---|---|---|
| CN | 209422969 U | * | 9/2019 |
| CN | 212818132 U | * | 3/2021 |
| CN | 213285543 U | * | 5/2021 |
| CN | 219782920 U | * | 10/2023 |
| KR | 20160001001 U | * | 3/2016 |
| KR | 101989309 B1 | * | 6/2019 |

OTHER PUBLICATIONS

KR20160001001, Mar. 2016, Description translation (Year: 2016).*
CN219782920, Oct. 2023, Description translation (Year: 2023).*

* cited by examiner

*Primary Examiner* — Joseph M. Pelham
(74) *Attorney, Agent, or Firm* — Jeenam Park

(57) ABSTRACT

The present disclosure relates to a simple assembled hand warmer, which includes two body parts that can be spliced and separated, i.e., a first hand warmer body and a second hand warmer body; the first hand warmer body is provided with a first splicing surface, the second hand warmer body is provided with a second splicing surface; a splicing mechanism is provided between the first splicing surface and the second splicing surface, the splicing mechanism includes at least one splicing convex block provided on the first splicing surface and at least one splicing groove provided on the second splicing surface. The splicing convex block is interference-fit with the splicing groove; and during splicing, the splicing convex block of the first hand warmer body is embedded into the splicing groove of the second hand warmer body.

19 Claims, 16 Drawing Sheets

SIMPLE HAND WARMER

CROSS-REFERENCE TO RELATED APPLICATIONS

This application claims priority to Chinese Patent Application No. 202323083116.X, filed on Nov. 14, 2023, which is hereby incorporated by reference in its entirety.

TECHNICAL FIELD

The present disclosure relates to the field of hand warmer technologies, and in particular, to a simple assembled hand warmer.

BACKGROUND

In winter, the temperature is generally low, and people may feel their hands very cold and even suffer from frostbite when going out. Hand warmer is a self-heating product made by applying physical or chemical principles, which can play a role in preventing and driving out cold in cold winter.

The existing hand warmer is assembled by magnetic suction, which generally includes a shell, a magnet, and a heating component provided inside the shell. The magnetic suction assembly cost is high, and during use, the magnet is easy to adsorb iron filings and is not easy to clean.

SUMMARY

The purpose of the present disclosure is to provide a simple assembled hand warmer, which has a simple structure, low cost, and will not adsorb iron filings.

To achieve the above objectives, the present disclosure adopts the following technical solution:

a simple assembled hand warmer includes two hand warmer bodies that can be aligned and separated, i.e., a first hand warmer body and a second hand warmer body, the first hand warmer body is provided with a first splicing surface, the second hand warmer body is provided with a second splicing surface;

a splicing mechanism is provided between the first splicing surface and the second splicing surface, the splicing mechanism includes at least one splicing convex block provided on the first splicing surface and at least one splicing groove provided on the second splicing surface, the splicing convex block is interference-fit with the splicing groove;

the splicing convex block of the first hand warmer body is embedded into the splicing groove of the second hand warmer body during splicing.

According to an implementation mode of the present disclosure, the splicing convex block has a shape of polygonal, and a shape of the splicing groove is adapted to the splicing convex block.

According to an implementation mode of the present disclosure, the splicing convex block has a shape of triangular.

According to an implementation mode of the present disclosure, the splicing convex block has as shape of hexagonal.

According to an implementation mode of the present disclosure, the splicing convex blocks on the first splicing surface includes three first splicing convex blocks, and the first splicing surface is further provided with three first splicing grooves, where each of the first splicing convex block is coplanar with a side surface of an adjacent first splicing groove at an adjacency position that the first splicing convex is adjacent to the adjacent first splicing groove;

the splicing groove of the second splicing surface includes three second splicing grooves, and the second splicing surface is further provided with three second splicing convex blocks with hexagonal shapes; each of the second splicing convex block is coplanar with a side surface of an adjacent second splicing groove at an adjacency position that the second splicing convex block is adjacent to the adjacent second splicing groove;

shapes of the three first splicing grooves are adapted to the three second splicing convex blocks; the three first splicing convex blocks are respectively embedded into the three second splicing grooves and the three second splicing convex blocks are respectively embedded into the three first splicing grooves during splicing.

According to an implementation mode of the present disclosure, the three first splicing convex blocks and three first splicing grooves are distributed along a same center circular, and the three first splicing convex blocks and three first splicing grooves are surrounded one side facing a center to form a hexagonal shape; the three second splicing convex blocks and the three second splicing grooves are all distributed along a same center circular, and the three second splicing convex blocks and the three second splicing grooves are surrounded one side facing a center to form a hexagonal shape.

According to an implementation mode of the present disclosure, side surfaces of the splicing convex block and the splicing groove are both flat surfaces, or the side surfaces of the splicing convex block and the splicing groove are both curved surfaces.

According to an implementation mode of the present disclosure, the first splicing surface is further provided with at least one splicing groove, and the second splicing surface is further provided with at least one splicing convex block.

According to an implementation mode of the present disclosure, each of the first hand warmer body and the second hand warmer body includes a shell, a heating component arranged inside the shell, a power supply, and a control circuit board.

According to an implementation mode of the present disclosure, the shell includes an upper shell and a lower shell, an outer surface of the upper shell is an arc-shaped surface, the first splicing surface is a lower end face of the lower shell of the first hand warmer body, the second splicing surface is a lower end face of the lower shell of the second hand warmer body, and the first splicing surface and the second splicing surface are both flat surfaces.

According to an implementation mode of the present disclosure, there is a distance between the first splicing surface and the second splicing surface, and a height of the splicing convex block is greater than a depth of the splicing groove.

According to an implementation mode of the present disclosure, the first splicing surface and the second splicing surfaces are tightly fitted together, and the height of the splicing convex block is equal to or less than the depth of the splicing groove.

According to an implementation mode of the present disclosure, each of the first splicing surface and the second splicing surface includes a main splicing surface and at least one secondary splicing surface, the splicing convex block is provided on the secondary splicing surface of the first splicing surface, and the splicing groove is provided on the secondary splicing surface of the second splicing surface, the main splicing surface of the first splicing surface is arranged to be an included angle relative to the secondary splicing surface of the first splicing surface; and the main splicing surface of the second splicing surface is arranged to be an included angle relative to the secondary splicing surface of the second splicing surface.

According to an implementation mode of the present disclosure, the splicing convex block is not vertically arranged with the main splicing surface of the first splicing surface.

According to an implementation mode of the present disclosure, a protruding direction of the splicing convex block is parallel to the main splicing surface of the first splicing surface.

According to an implementation mode of the present disclosure, the first splicing surface is provided with two secondary splicing surfaces respectively arranged on both sides of the main splicing surface of the first splicing surface, i.e., a left secondary splicing surface of the first splicing surface and a right secondary splicing surface of the first splicing surface; the second splicing surface is provided with two secondary splicing surfaces respectively arranged on both sides of the main splicing surface of the second splicing surface, i.e., a left secondary splicing surface of the second splicing surface and a right secondary splicing surface of the second splicing surface; where the left secondary splicing surface of the first splicing surface is provided with a splicing convex block, and the right secondary splicing surface of the second splicing surface is provided with a splicing groove.

According to an implementation mode of the present disclosure, the hand warmer includes two hand warmer bodies parts that are spliced and separated, i.e., a first hand warmer body and a second hand warmer body; the first hand warmer body is provided with a first splicing surface, the second hand warmer body is provided with a second splicing surface;

a splicing mechanism is provided between the first splicing surface and the second splicing surface, the splicing mechanism includes at least one first splicing convex block and at least one first splicing groove that restrict a longitudinal movement of the first hand warmer body, at least one second splicing convex block and at least one splicing groove that restricts a lateral movement of the second hand warmer body;

the first splicing convex block is embedded into the first splicing groove, and the second splicing convex block is embedded into the second splicing groove during splicing.

According to an implementation mode of the present disclosure, each of the first splicing surface and the second splicing surface includes a main splicing surface and two secondary splicing surfaces arranged on both sides of the main splicing surface, i.e., a main splicing surface of the first splicing surface, a left secondary splicing surface of the first splicing surface, a right secondary splicing surface of the first splicing surface, a main splicing surface of the second splicing surface, a left secondary splicing surface of the second splicing surface, and a right secondary splicing surface of the second splicing surface;

the main splicing surface of the first splicing surface is arranged to be at an included angle relative to the secondary splicing surface of the first splicing surface, and the main splicing surface of the second splicing surface is arranged to be at an included angle relative to the secondary splicing surfaces of the second splicing surface;

the left secondary splicing surface of the first splicing surface and the left splicing surface of the second splicing surface are respectively provided with a first splicing convex block and a second splicing convex block;

the right secondary splicing surface of the first splicing surface and the right secondary splicing surface of the second splicing surface are respectively provided with a first splicing groove and a second splicing groove;

the first splicing convex block of the first hand warmer body is embedded in the first splicing groove of the second hand warmer body, the second splicing convex block of the first hand warmer body is embedded in the second splicing groove of the second hand warmer body, the first splicing convex block of the second hand warmer body is embedded in the first splicing groove of the first hand warmer body, and the second splicing convex block of the second hand warmer body is embedded into the second splicing groove of the first hand warmer body when splicing the hand warmer.

According to an implementation mode of the present disclosure, a top of the second splicing convex block has an arc-shaped guide surface.

According to an implementation mode of the present disclosure, a protruding direction of the first splicing convex block is perpendicular to a protruding direction of the second splicing convex block.

The beneficial effects of the present disclosure:
- the present disclosure provides interference fit splicing convex blocks and splicing grooves on the splicing surface of the hand warmer body, which can assemble and separate two hand warmer bodies. When assembling, it is convenient to carry and store outside, and when separating, it can be used as two independent hand warmers. The structure is simple, the cost is low, and it will not adsorb iron filings;
- by providing three hexagonal first splicing convex blocks, three hexagonal first splicing grooves, and three hexagonal second splicing convex blocks, three hexagonal second splicing grooves on the second splicing surface, the first hand warmer body and second hand warmer body are more tightly assembled;
- by splicing convex blocks and splicing grooves, the first hand warmer body and second hand warmer body can be accurately positioned, avoiding misalignment between the first hand warm body and the second hand warmer body after assembly;
- the splicing convex block and splicing groove can be integrally formed on the hand warmer body, with a simple mold structure and low cost;
- the splicing convex blocks and splicing grooves can be made of wear-resistant materials, with a long service life.

In order to provide a clearer explanation of the structural features, technical means, and specific objectives and functions achieved by the present disclosure, the following will provide a further detailed explanation of the present disclosure in combination with the drawings and specific embodiments.

Figure 1:
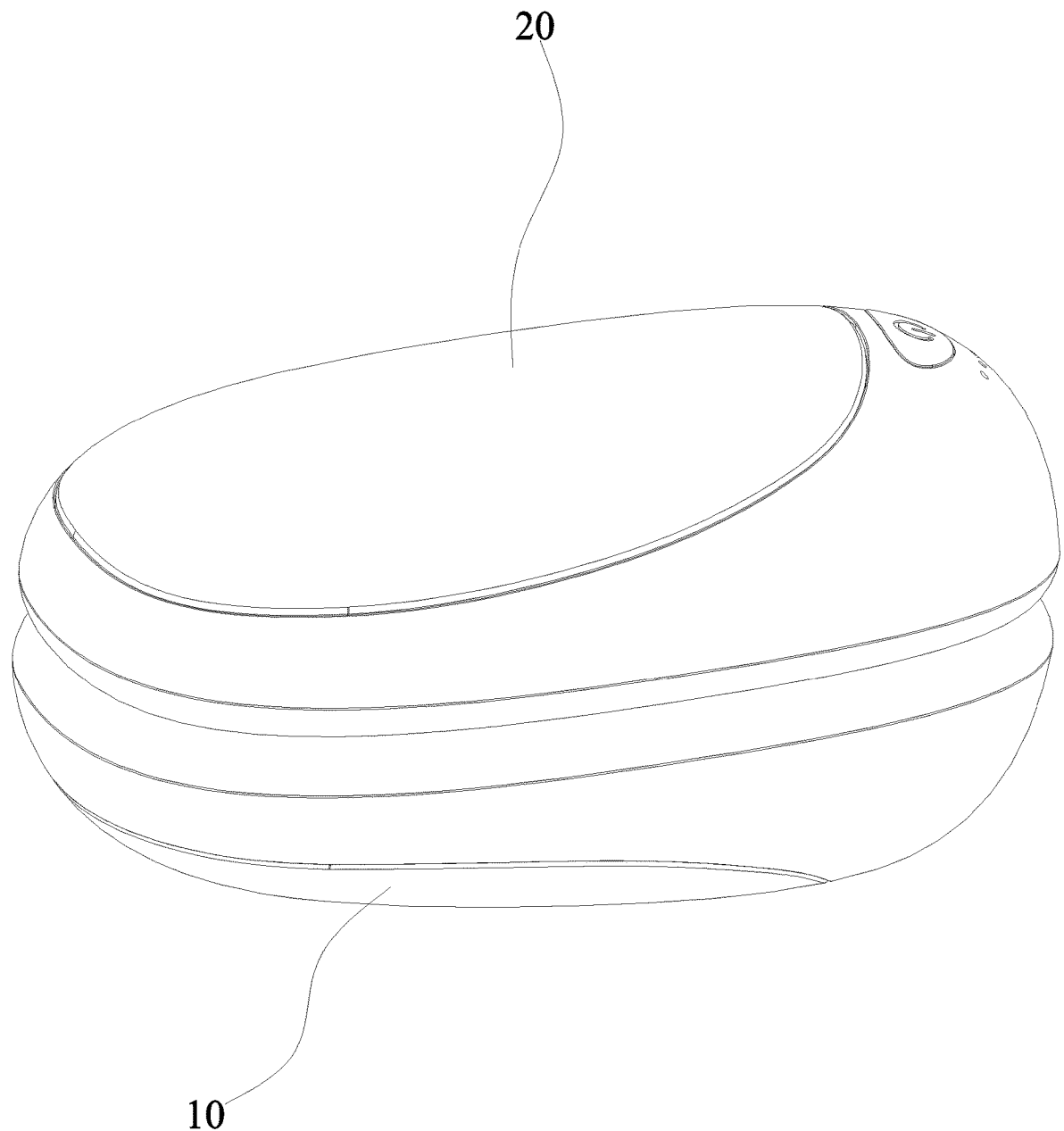
FIG. 1 is an assembly structure diagram of an embodiment of the present disclosure.

Numeral reference: 10—first hand warmer body; 11—first splicing surface; 11a—main splicing surface of the first splicing surface; 11b—left secondary splicing surface of the first splicing surface; 11c—right secondary splicing surface of the first splicing surface; 20—second hand warmer body; 21—second splicing surface; 21a—main splicing surface of the second splicing surface; 21b—left secondary splicing surface of the second splicing surface; 21c—right secondary splicing surface of the second splicing surface; 30—splicing mechanism; 31—splicing convex block; 311—first splicing convex block; 311a—side surface of the first splicing convex block; 312—second splicing convex block; 312a—side surface of the second splicing convex block; 32—splicing groove; 321—first splicing groove; 321a—side surface of the first splicing groove; 322—second splicing groove; 322a—side surface of the second splicing groove; 40—heating component; 50—power supply; 60—control circuit board.

DESCRIPTION OF EMBODIMENTS

In the description of the present disclosure, it should be noted that terms "center", "up", "bottom", "left", "right", "vertical", "horizontal", "inside", "outside", etc. indicate that the orientation or position relationship based on the orientation or position relationship shown in the drawings is only for the convenience of describing the disclosure and simplifying the description, rather than indicating or implying that the position or element referred to must have a specific orientation constructed and operated in a specific orientation, therefore it cannot be understood as a limitation of the present disclosure.

In the description of the present disclosure, it should be noted that unless otherwise specified and limited, the terms "installation", "connection to", and "connection with" should be understood broadly, for example, it can be a fixed connection, a detachable connection, or an integrated connection; it can be a mechanical connection or an electrical connection; it can be a directly connection, or an indirect connection through an intermediate medium, or it can be an internal connection between two components. For ordinary technical personnel in the art, the specific meanings of the above terms in the present disclosure can be understood according to the specific situation.

Embodiment 1

Figure 2:
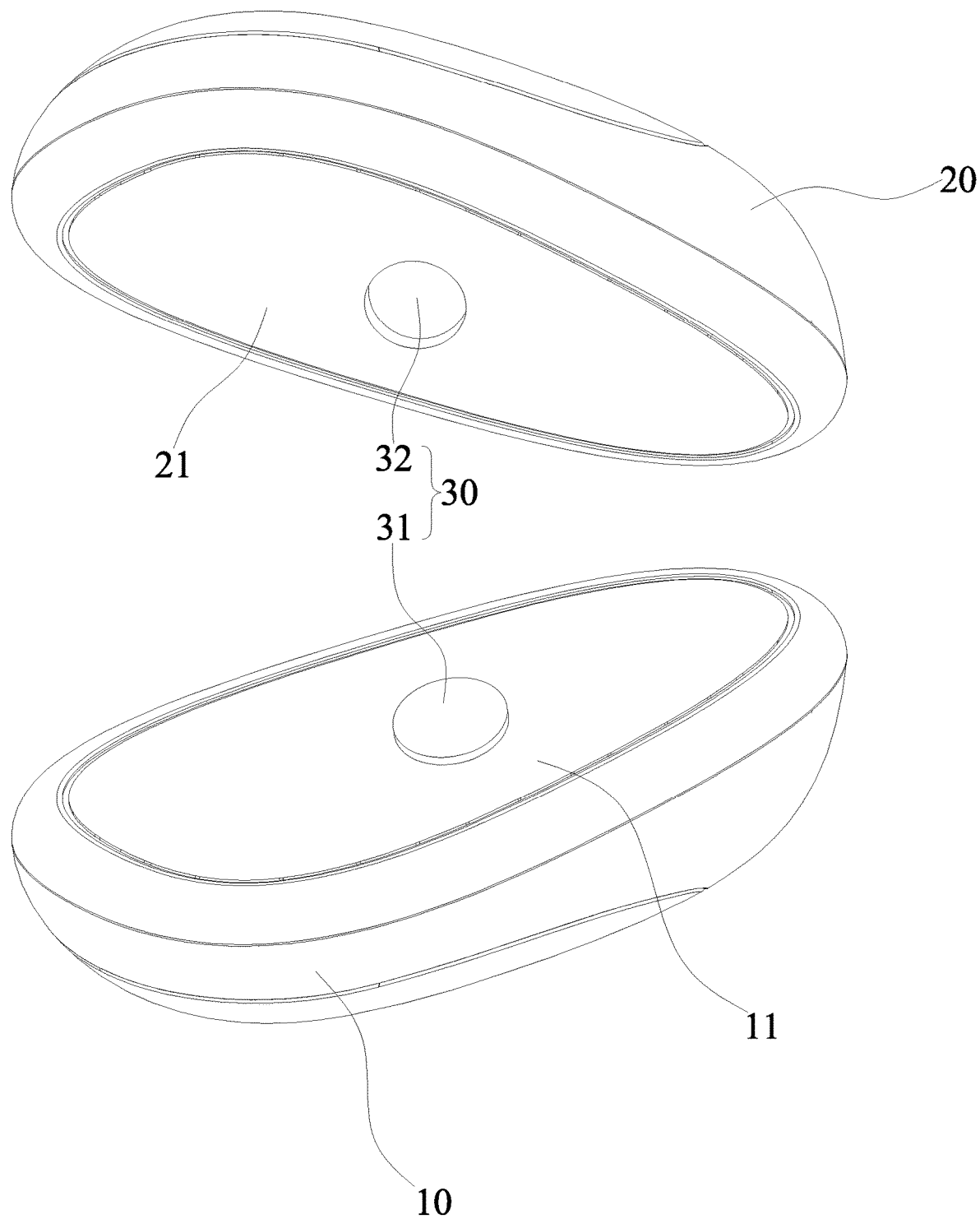
FIG. 2 is a structural diagram of Embodiment 1 of the present disclosure.

As shown in FIGS. 1-2, the present disclosure discloses a simple assembled hand warmer, including two hand warmer bodies that can be spliced and separated, i.e., a first hand warmer body 10 and a second hand warmer body 20. The first hand warmer body 10 is provided with a first splicing surface 11, the second hand warmer body 20 is provided with a second splicing surface 21, and a splicing mechanism 30 is provided between the first splicing surface 11 and the second splicing surface 21, the splicing mechanism 30 includes at least one splicing convex block 31 provided on the first splicing surface 11 and at least one splicing groove 32 provided on the second splicing surface 21. By proving interference fit splicing convex blocks 31 and splicing grooves 32 on the splicing surface of the hand warmer body, two hand warmer bodies can be assembled and separated. When assembled, it is also convenient to carry and store outside. When separated, it can be used as two independent hand warmer bodies, with a simple structure, low cost, and no adsorption of iron filings; by the splicing convex block 31 with the splicing groove 32, the first hand warmer body 10 can be accurately positioned with the second hand warmer body 20, avoiding misalignment between the first hand warmer body 10 and the second hand warmer body 20 after assembly.

In this embodiment, the first splicing surfaces 11 and the second splicing surface 21 are both flat surfaces, a splicing convex block 31 is provided on the first splicing surface 11 and a splicing groove 32 is provided on the second splicing surface 21. The shape of the splicing convex block 31 is circular, and the shape of the splicing groove 32 is adapted to the splicing convex block 31. The splicing convex block 31 is interference-fit with the splicing groove 32. During splicing, the splicing convex block 31 of the first hand warmer body 10 is embedded into the splicing groove 32 of the second hand warmer body 20. The splicing convex block 31 and splicing groove 32 can be integrally formed on the hand warmer body. The mold structure is simple, the cost is low, and the splicing convex block 31 and splicing groove 32 can be made of wear-resistant materials, improving their service life.

Embodiment 2

Figure 3:
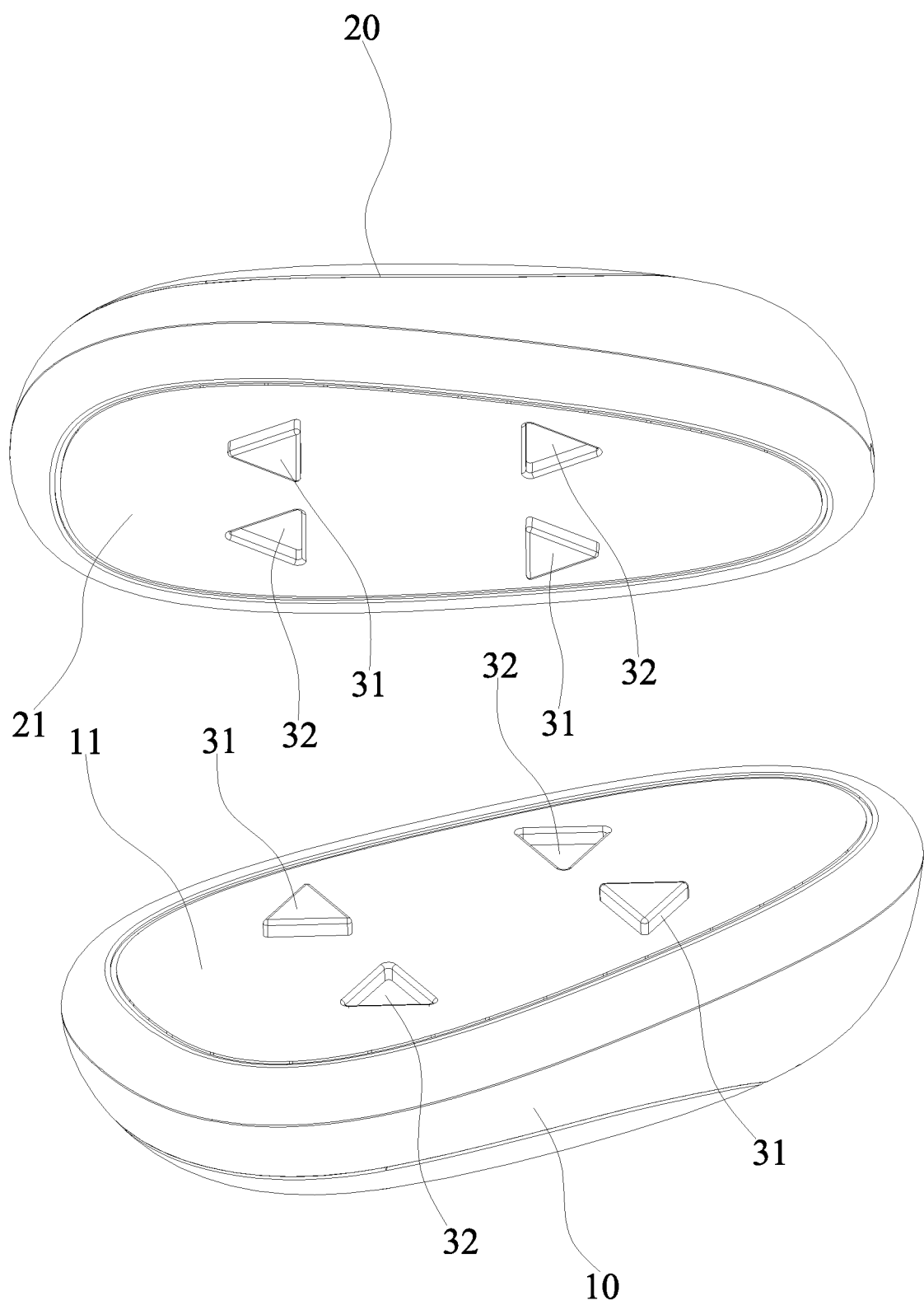
FIG. 3 is a structural diagram of Embodiment 2 of the present disclosure.

As shown in FIG. 3, the difference between this embodiment and the above embodiment is that the shape of the splicing convex block 31 is a triangle; the first splicing surface 11 is provided with two splicing convex blocks 31 and two splicing grooves 32, while the second splicing surface 21 is provided with two splicing convex blocks 31 and two splicing grooves 32.

Side surfaces of the splicing convex block 31 and the splicing groove 32 are both flat surfaces.

The number of splicing convex blocks and splicing grooves is not limited to two, but can also be one, three, four, five, or six, depending on the size of the product and the size of the blocks.

Embodiment 3

Figure 4:
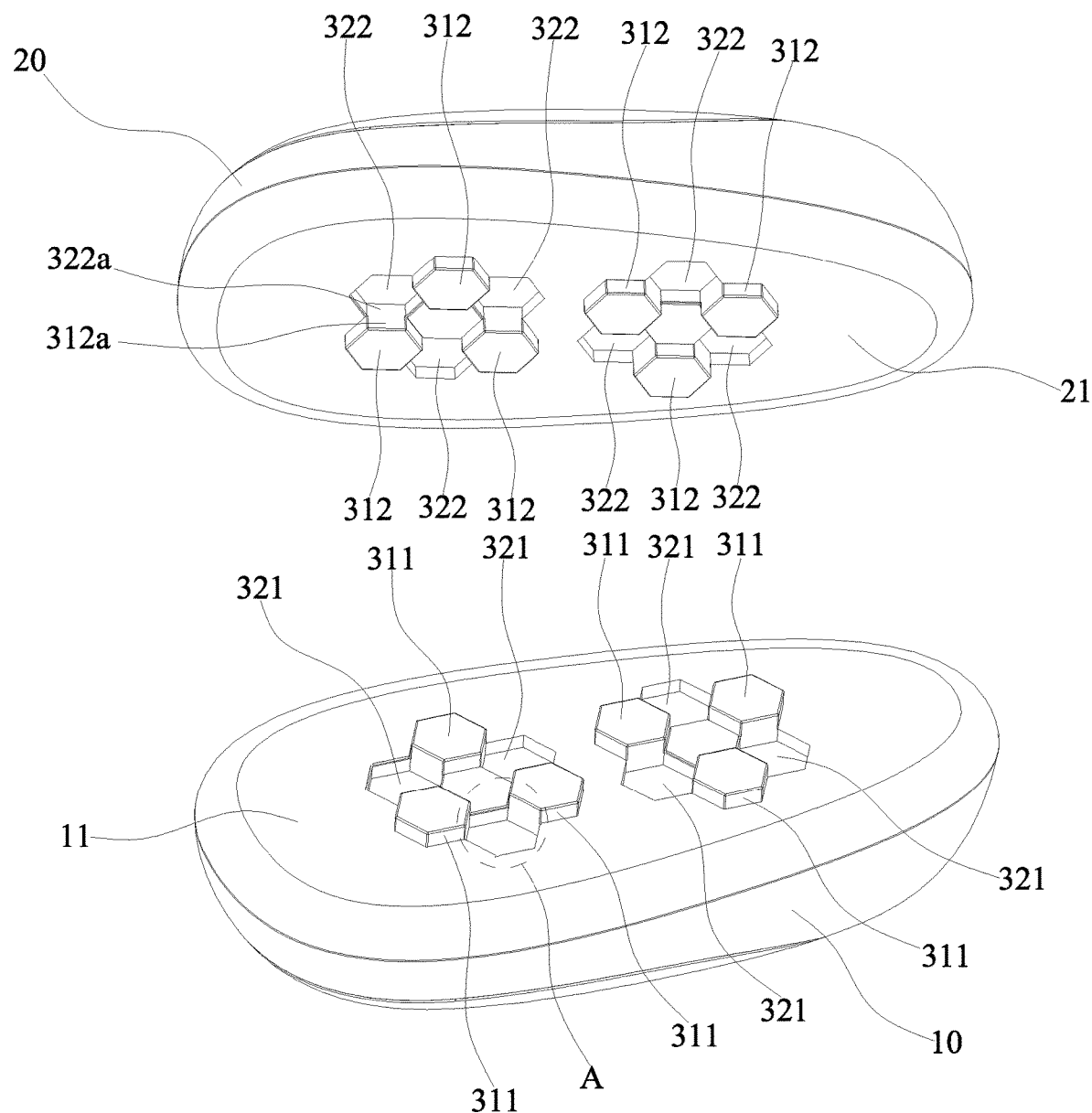
FIG. 4 is a structural diagram of Embodiment 3 of the present disclosure.
Figure 5:
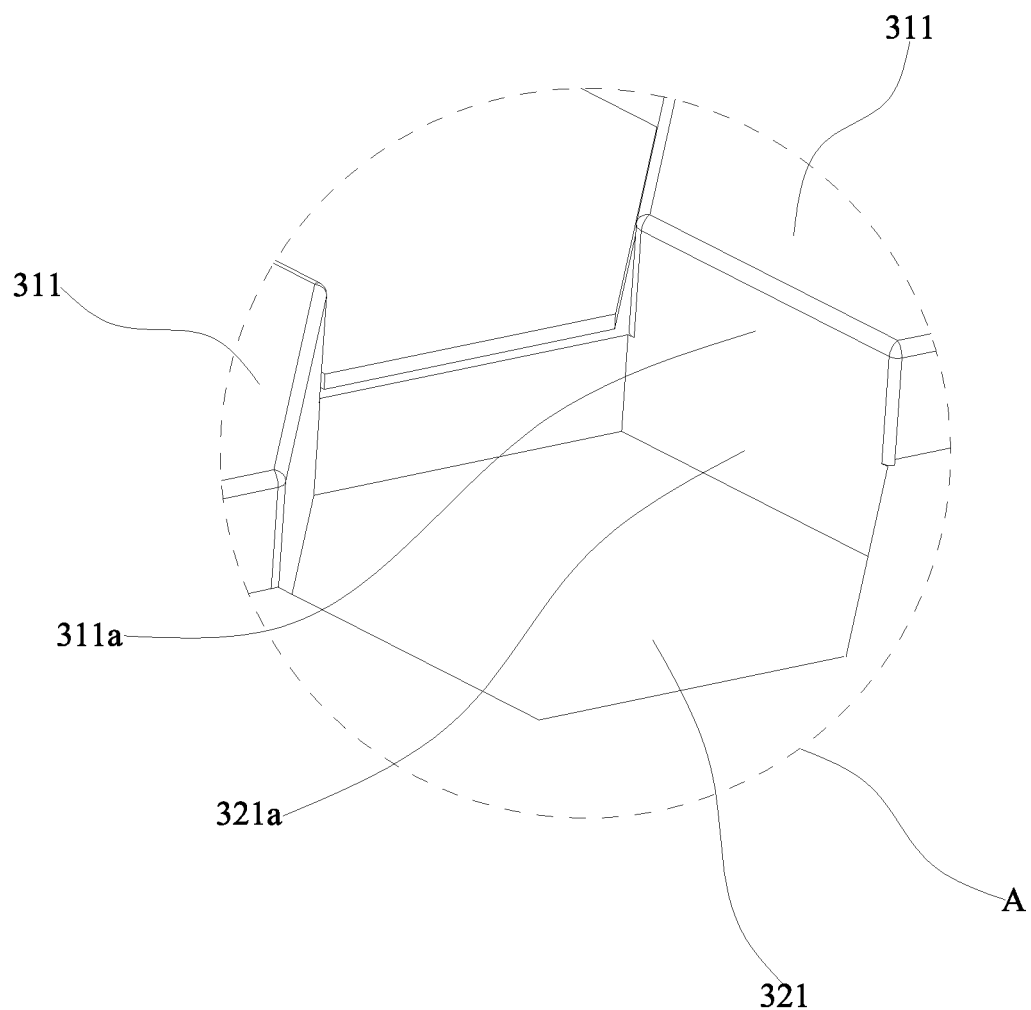
FIG. 5 is a partially enlarged view of position A in FIG. 4.

As shown in FIGS. 4-5, the difference between this embodiment and the above embodiments is that this embodiment has two sets of splicing structures. Since the two sets of splicing structures are the same, only one set of splicing structures is specifically described. Each set includes three first splicing convex blocks 311, three first splicing grooves 321, three second splicing convex blocks 312, and three second splicing grooves 322; shapes of the first splicing convex block 311, the first splicing groove 321, the second splicing convex block 312, and the second splicing groove 322 are both hexagonal. Three first splicing convex blocks 311 and three first splicing grooves 321 are arranged on the first splicing surface 11, and each first splicing convex block 311 is coplanar with a side surface of an adjacent first splicing groove 321, that is, the side surface of the first splicing convex block 311a is coplanar with the side surface of the first splicing groove.

Three second splicing convex blocks 312 and three second splicing grooves 322 are arranged on the second splicing surface 21, and each second splicing convex block 312 is coplanar with a side surface of an adjacent second splicing groove 322, as mentioned above, that is, the side surface of the second splicing convex block is coplanar with the side surface of the second splicing groove (not shown).

The three first splicing convex blocks 311 and the three first splicing grooves 321 are all distributed along a same center circular, and the three first splicing convex blocks 311 and the three first splicing grooves 321 are surrounded one side facing a center to form a hexagonal shape.

The three second splicing convex blocks 312 and the three second splicing grooves 322 are all distributed along a same center circular, and the three second splicing convex blocks 312 and the three second splicing grooves 322 are each surrounded one side facing a center to form a hexagonal shape.

The side lengths of the three first splicing convex blocks 311 are equal, the side lengths of the three first splicing grooves 321 are equal, the side lengths of the three second splicing convex blocks 312 are equal, and the side lengths of the three second splicing grooves 322 are equal.

When splicing, the three first splicing convex blocks 311 are respectively embedded into the three second splicing grooves 322, and the three second splicing convex blocks 312 are respectively embedded into the three first splicing grooves 321.

The first splicing convex block 311, the first splicing groove 321, the second splicing convex block 312, and the second splicing groove 322 can be arranged in this way to render the first hand warmer body 10 and the second hand warmer body 20 more tightly assembled.

Embodiment 4

Figure 6:
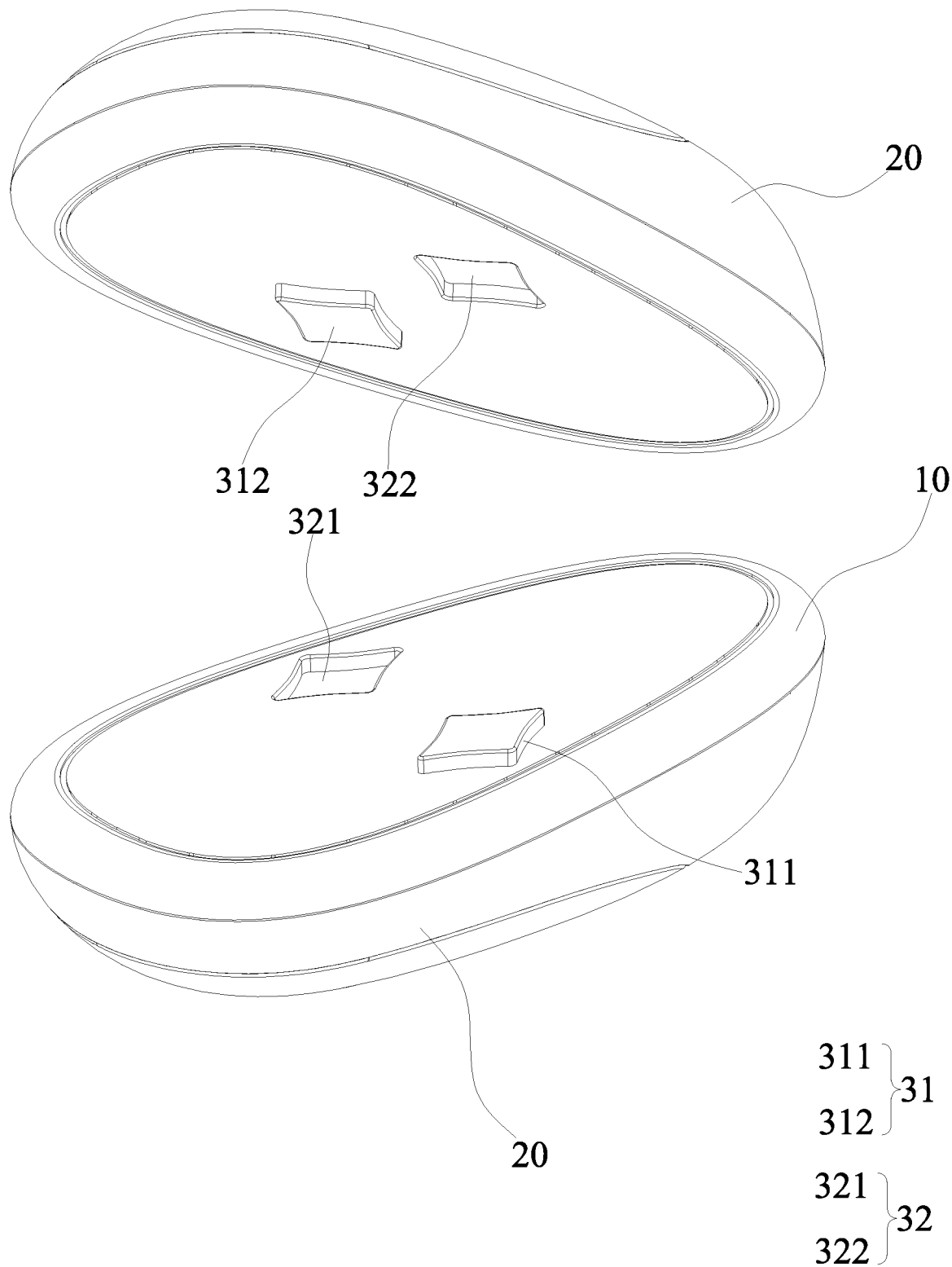
FIG. 6 is a structural diagram of Embodiment 4 of the present disclosure.
Figure 7:
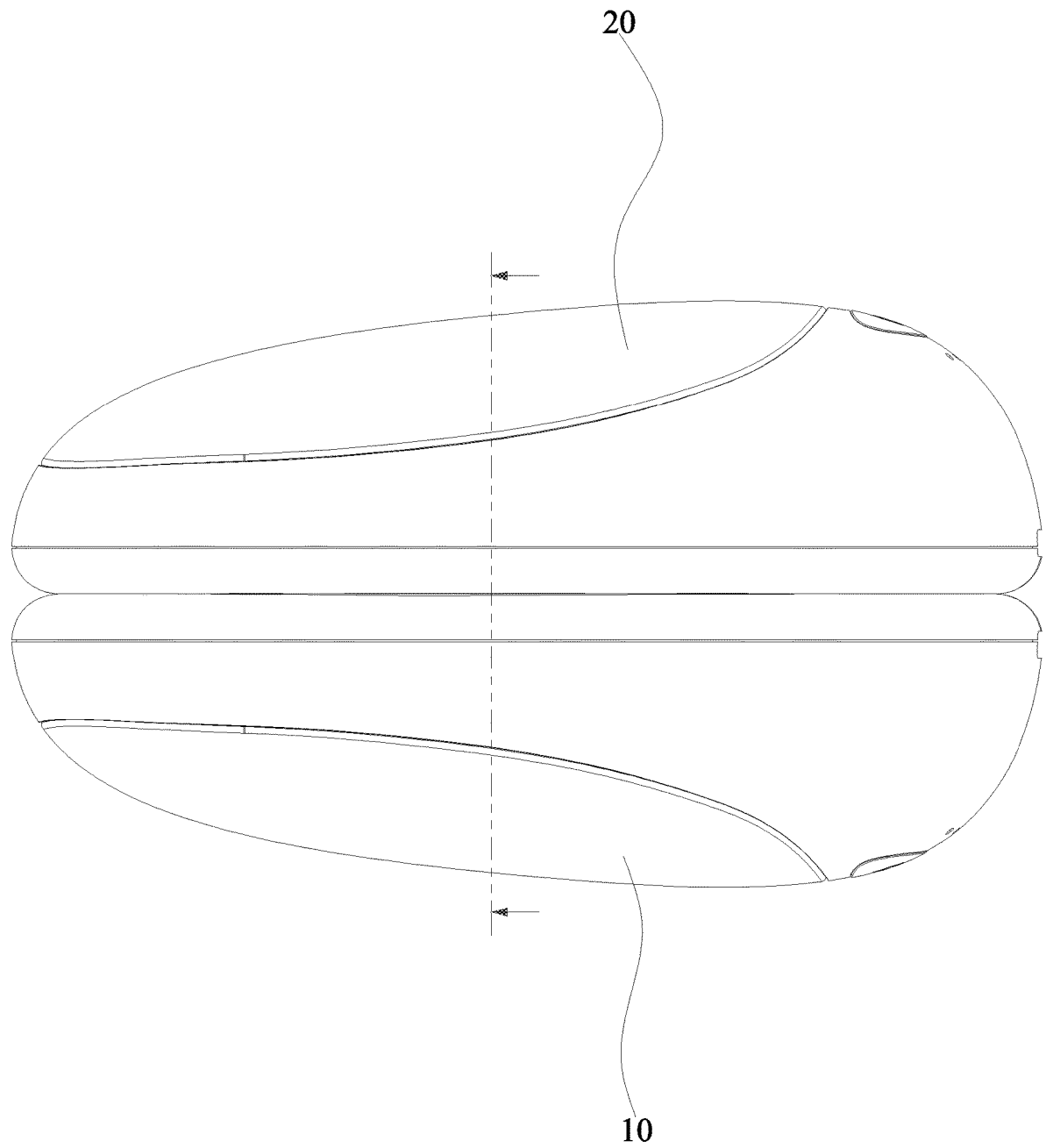
FIG. 7 is a front view of an assembly structure of Embodiment 4 of the present disclosure.
Figure 8:
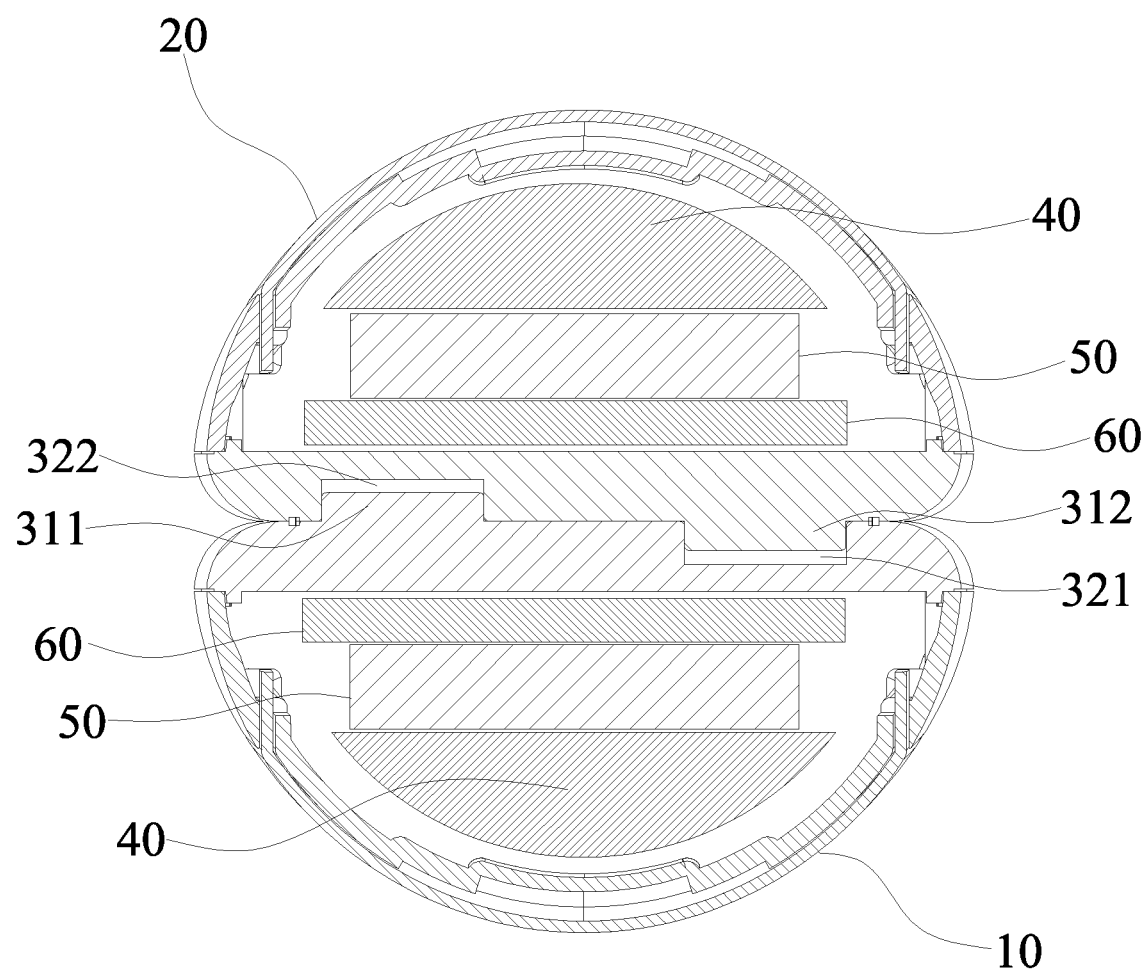
FIG. 8 is a cross-sectional view of FIG. 7.
Figure 9:
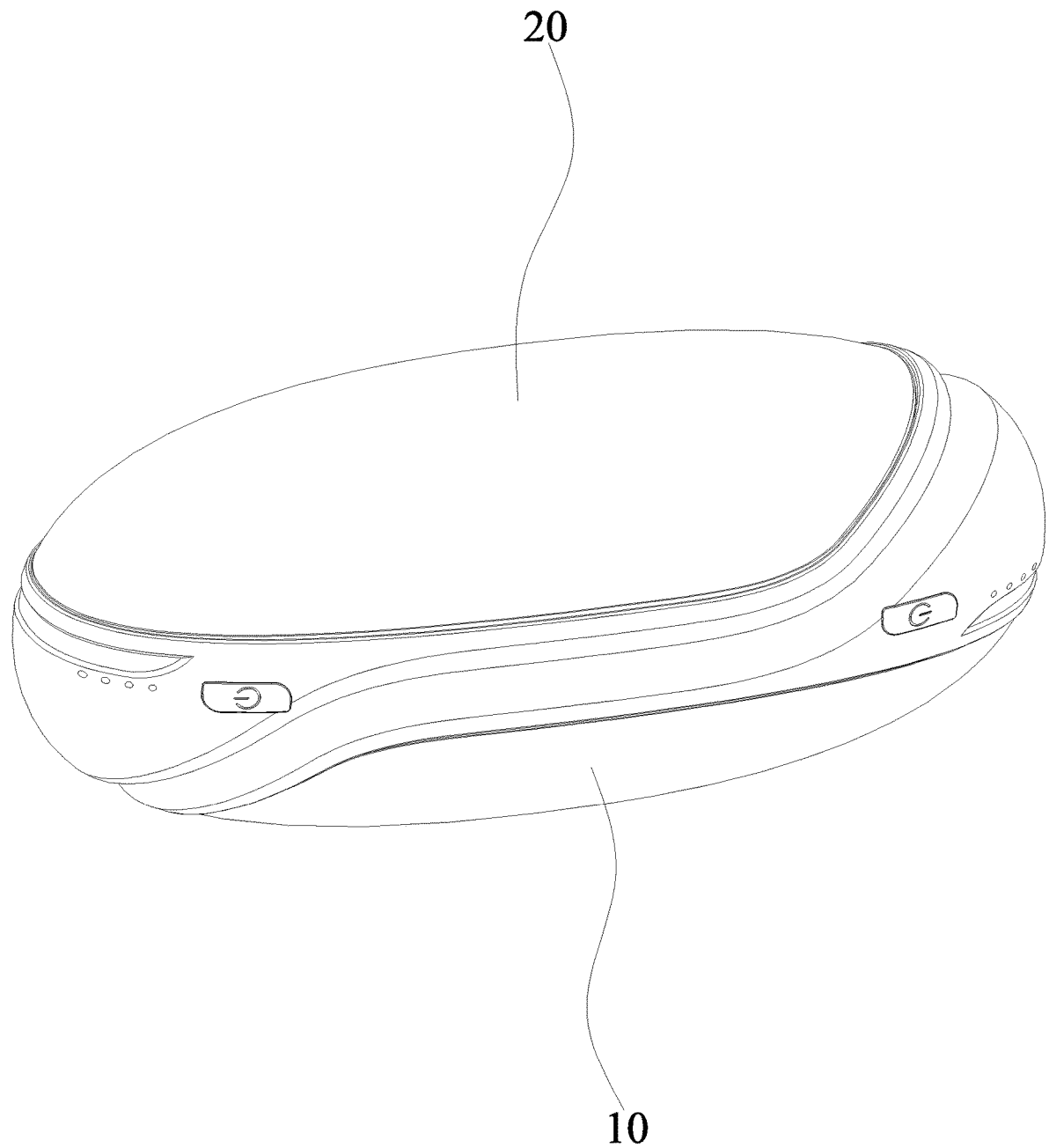
FIG. 9 is an assembly structure diagram of Embodiments 5 and 6 of the present disclosure.
Figure 10:
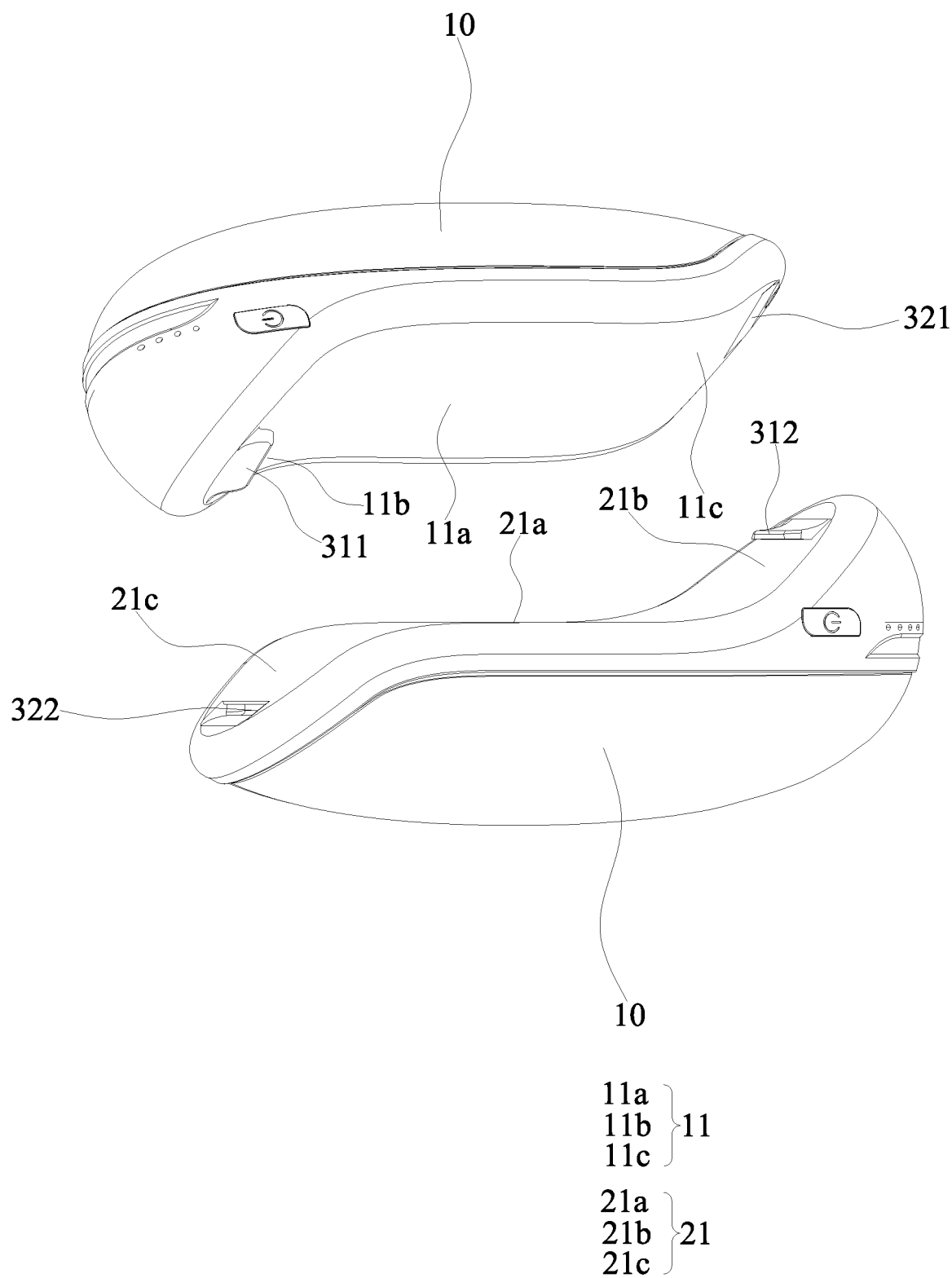
FIG. 10 is a structural diagram of Embodiment 5 of the present disclosure.
Figure 11:
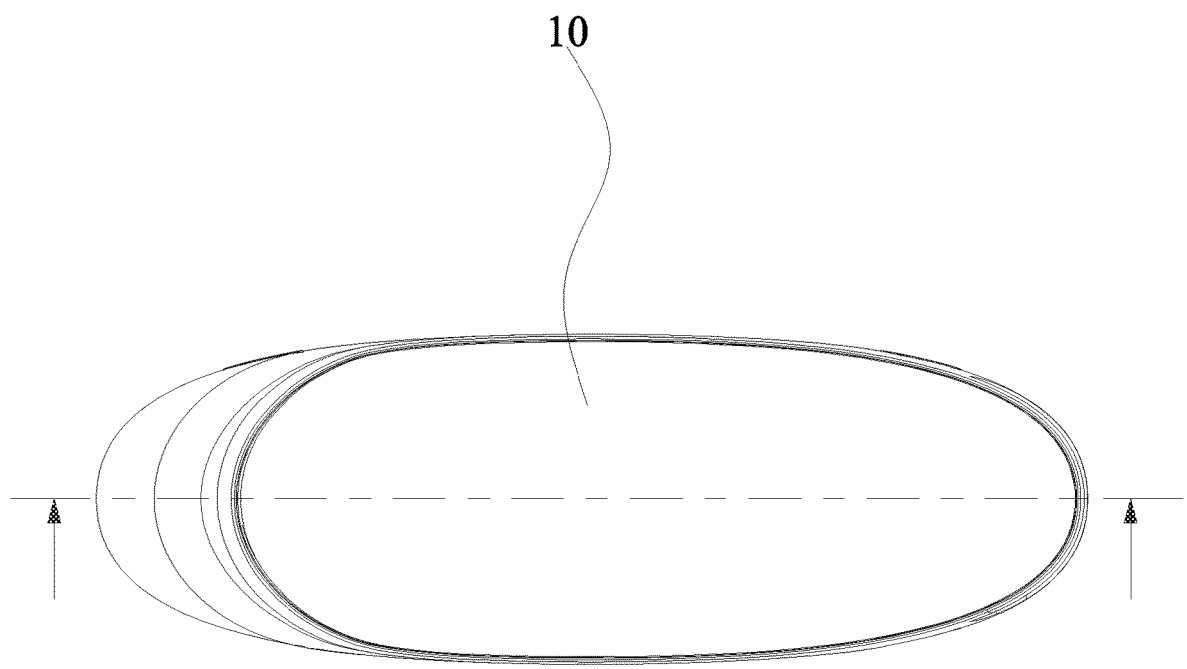
FIG. 11 is a top view of an assembly structure of Embodiments 5 and 6 of the present disclosure.
Figure 12:
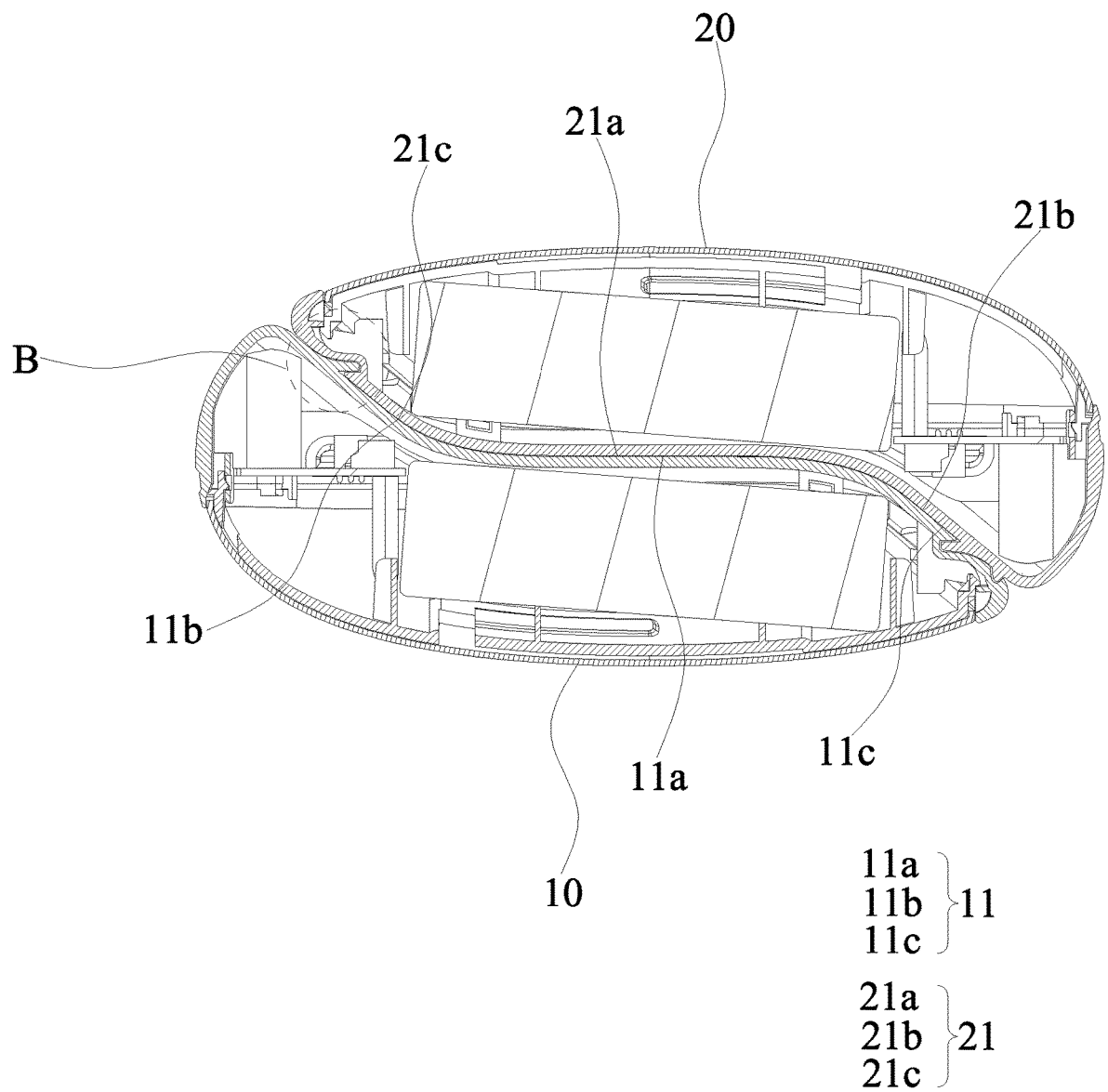
FIG. 12 is a cross-sectional view of Embodiment 5 of FIG. 11.
Figure 13:
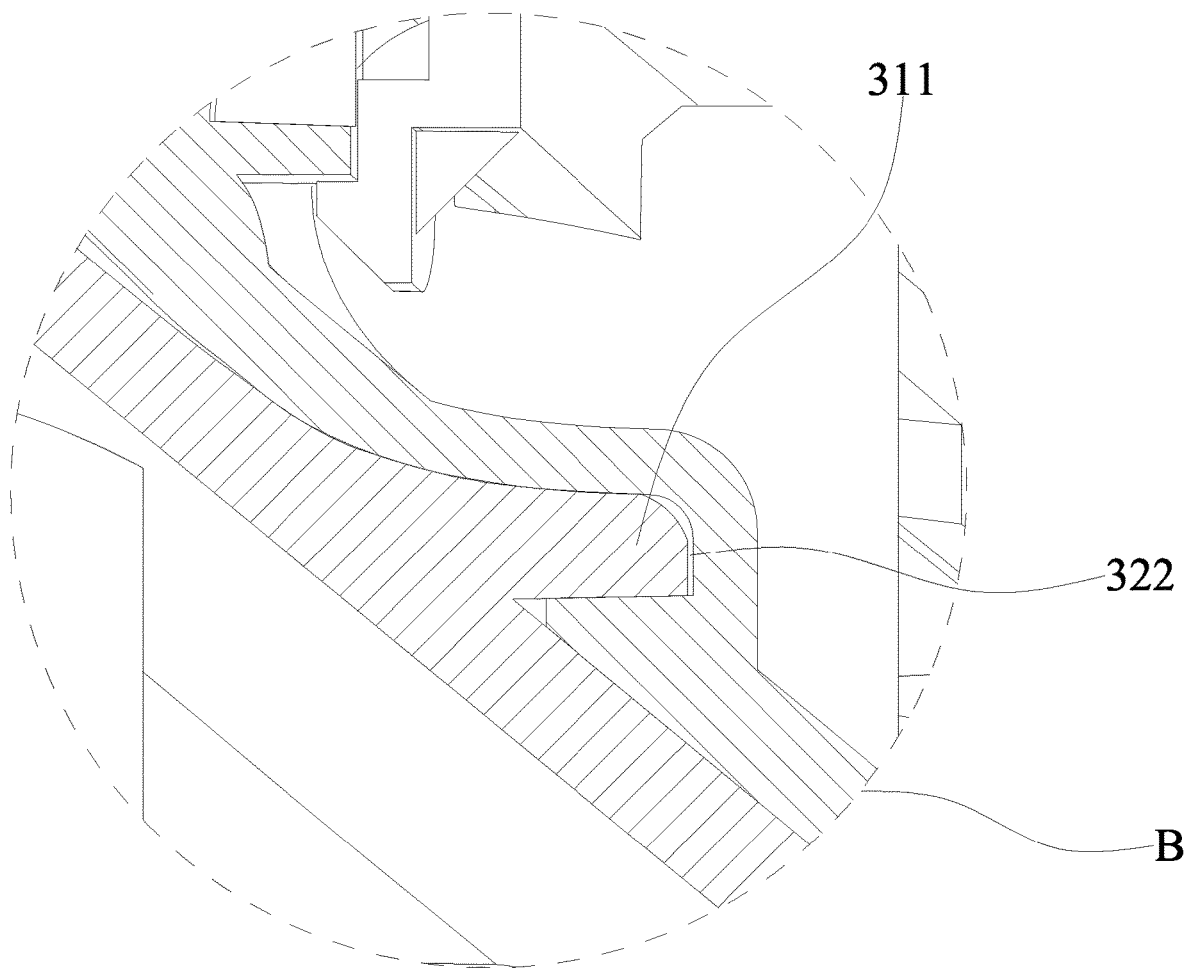
FIG. 13 is a partially enlarged view of position B in FIG. 12.
Figure 14:
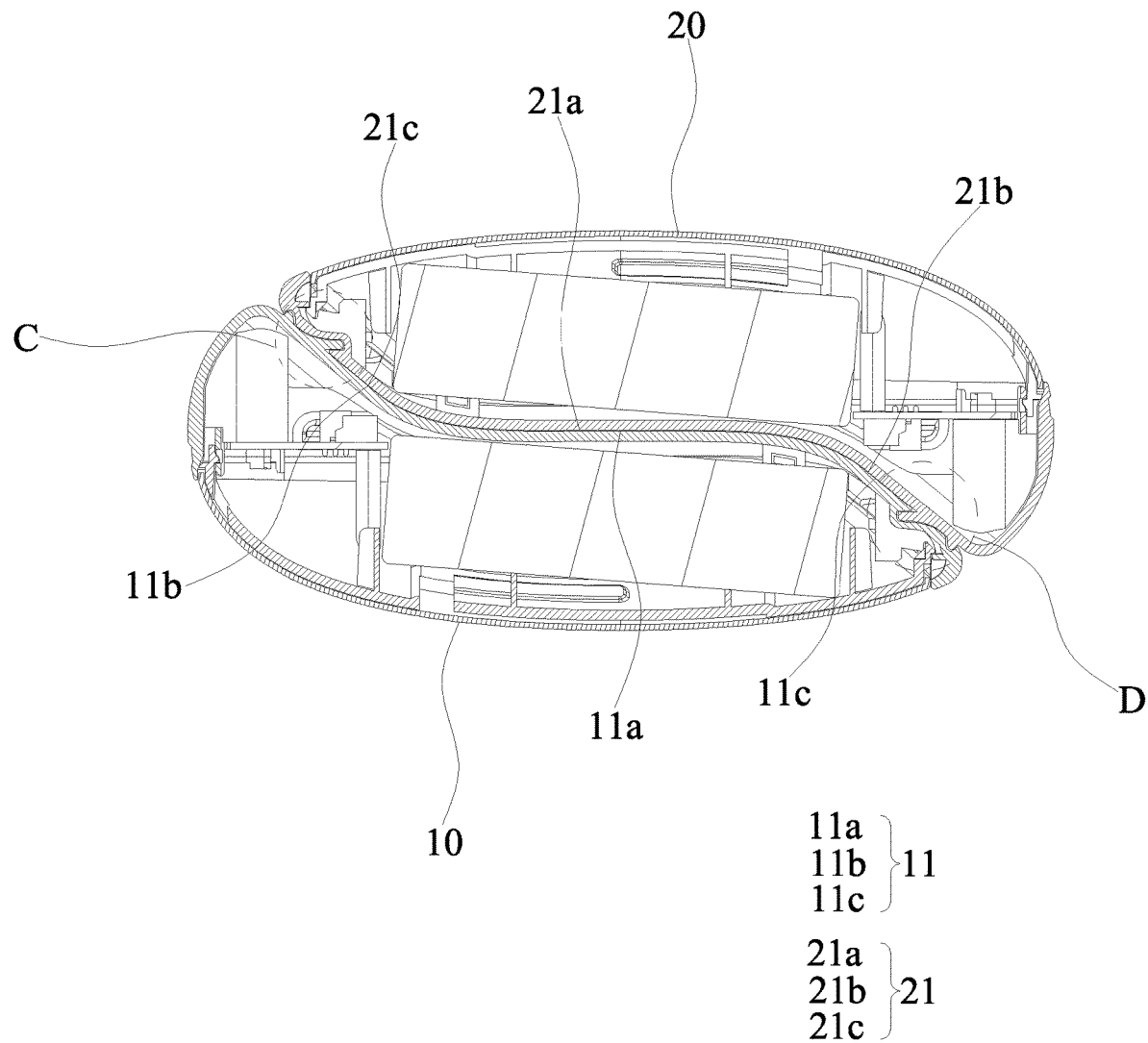
FIG. 14 is a cross-sectional view of Embodiment 6 of FIG. 11.
Figure 15:
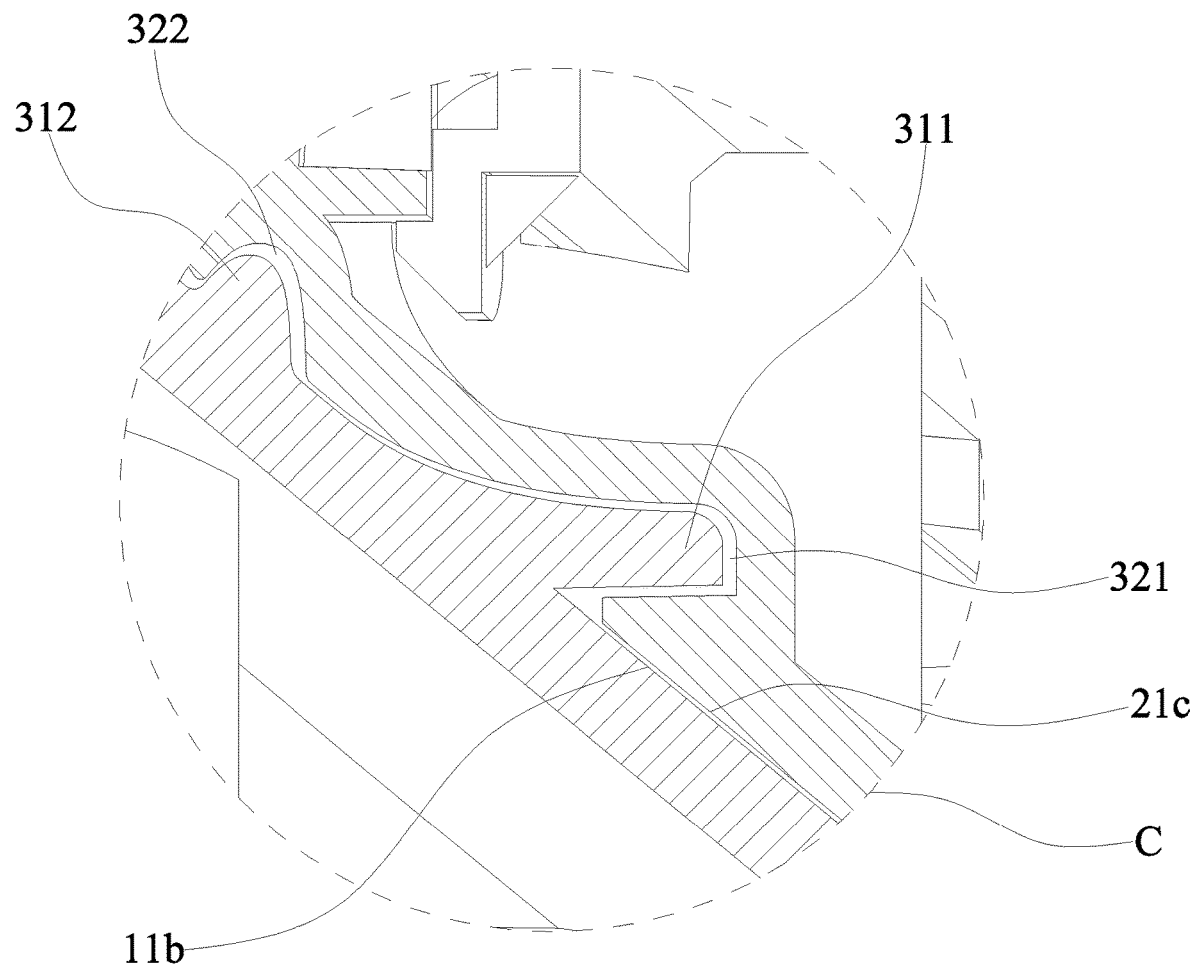
FIG. 15 is a partially enlarged view of position C in FIG. 14.
Figure 16:
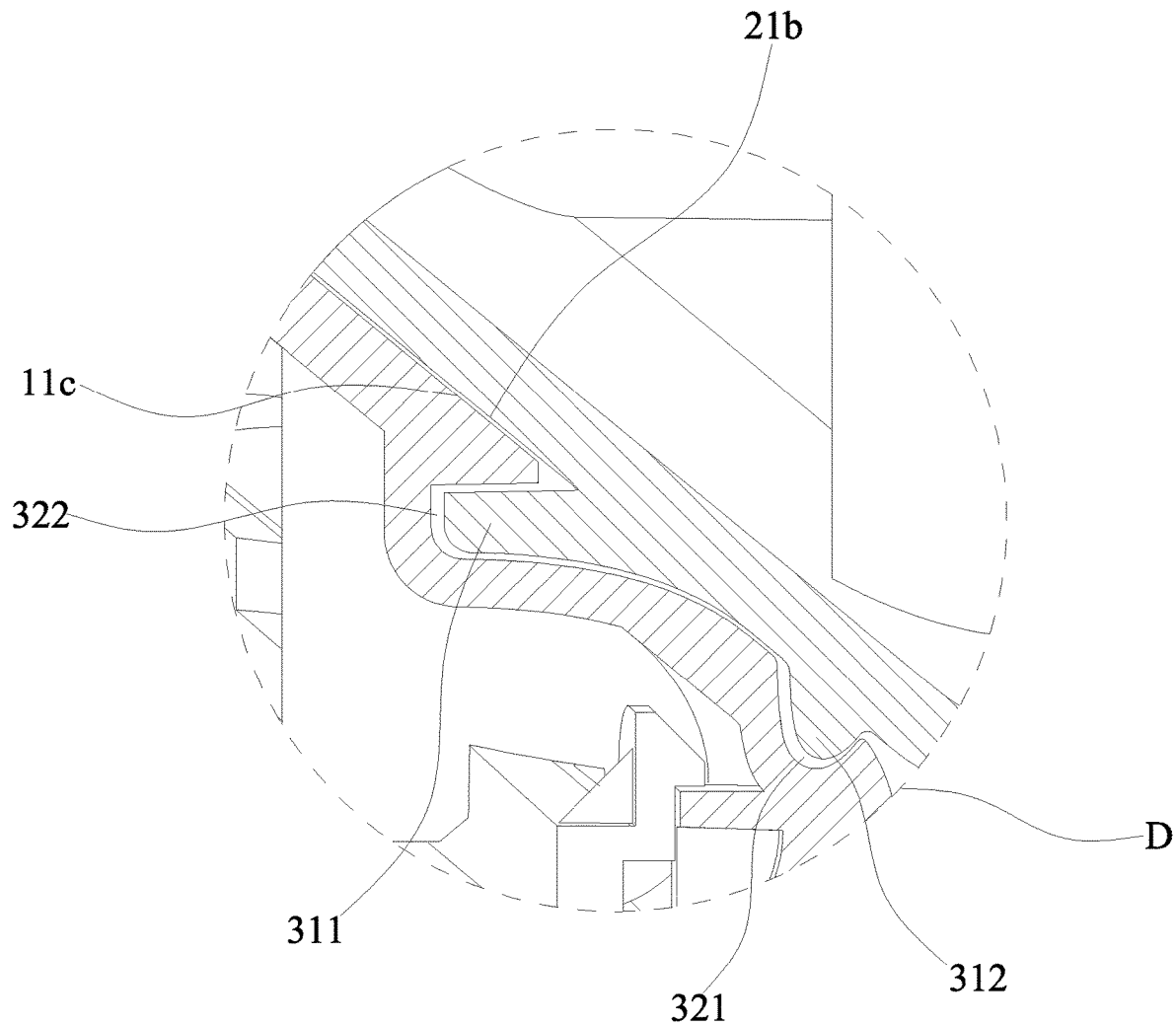
FIG. 16 is a partially enlarged view of position D in FIG. 14.

As shown in FIGS. 6-8, the first hand warmer body 10 and the second hand warmer body 20 each include a shell, a heating component 40 arranged inside the shell, a power supply 50, and a control circuit board 60. The shell includes an upper shell and a lower shell, and an outer surface of the upper shell is an arc-shaped surface that conforms to ergonomics. The first splicing surface 11 is a lower end face of the lower shell of the first hand warmer body 10, and the second splicing surface 21 is a lower end face of the lower shell of the second hand warmer body 20.

The difference between this embodiment and the above embodiment is that the shape of the splicing convex block 31 is irregular, such as in a shape of stars, hearts, etc., and the shape of the splicing groove 32 is suitable for the splicing convex block 31; the first splicing surface 11 is provided with a first splicing convex block 311 and a first splicing groove 321, and the second splicing surface 21 is provided with a second splicing convex block 312 and a second splicing groove 322.

In this embodiment, side surfaces of the splicing convex block 31 and the splicing groove 32 are both curved surfaces, and the splicing convex block 31 and the splicing groove 32 with curved side surface can also achieve interference fit.

It should be noted that the first splicing surface 11 and the second splicing surface 21 can be tightly fitted together, and a height of the splicing convex block 31 is equal to or less than a depth of the splicing groove 32. It should also be noted that there is a distance between the first splicing surface 11 and the second splicing surface 21, and the height of the splicing convex block 31 is greater than the depth of the splicing groove 32.

Embodiment 5

As shown in FIGS. 9-13, the difference between this embodiment and the above embodiment is that the first splicing surface 11 and the second splicing surface 21 each includes a main splicing surface and at least one secondary splicing surface. The splicing convex block 31 is provided on the secondary splicing surface of the first splicing surface 11, and the splicing groove 32 is provided on the secondary splicing surface of the second splicing surface 21. The main splicing surface of the first splicing surface 11 is arranged to be an included angle relative to the secondary splicing surface of the first splicing surface 11; and the main splicing surface of the second splicing surface 21 is arranged to be an included angle relative to the secondary splicing surface of the second splicing surface 21; the splicing convex block 31 is not vertically arranged with the main splicing surface of the first splicing surface 11a.

In this embodiment, a preferred implementation mode is that a protruding direction of the splicing convex block 31 is parallel to the main splicing surface of the first splicing surface 11a. The first splicing surface 11 is provided with two secondary splicing surfaces respectively arranged on both sides of the main splicing surface of the first splicing surface 11a, i.e., a left secondary splicing surface 11b of the first splicing surface and a right secondary splicing surface 11c of the first splicing surface; the second splicing surface 21 is provided with two secondary splicing surfaces respectively arranged on both sides of the main splicing surface 21a of the second splicing surface, i.e., a left secondary splicing surface 21b of the second splicing surface and a right secondary splicing surface 21c of the second splicing surface; the left secondary splicing surface 11b of the first splicing surface, the right secondary splicing surface 11c of the first splicing surface, the left splicing surface 21b of the second splicing surface, and the right splicing surface 21c of the second splicing surface are all curved surfaces.

The two secondary splicing surfaces of the first splicing surface 11 are respectively provided with a first splicing convex block 311 and a first splicing groove 321, and the two secondary splicing surfaces of the second splicing surface 21 are respectively provided with a second splicing convex block 312 and a second splicing groove 322.

In this embodiment, it should be noted that the first hand warmer body 10 can have the same shape and size as the second hand warmer body 20. It should also be noted that the first hand warmer body 10 can also have a different shape and size from the second hand warmer body 20.

Embodiment 6

As shown in FIGS. 11, 14, 15, and 16, the present disclosure further discloses a simple assembled hand warmer, which includes two hand warmer bodies that can be spliced and separated, i.e., a first hand warmer body 10 and a second hand warmer body 20; the first hand warmer body 10 is provided with a first splicing surface 11, and the second hand warmer body 20 is provided with a second splicing surface 21; there is a splicing mechanism between the first splicing surface 11 and the second splicing surface 21.

The splicing mechanism includes at least one first splicing convex block 311 and at least one splicing groove 321 corresponding to splicing convex block 311 that restrict a longitudinal movement of the hand warm hand body, at least one second splicing convex block 312 and at least one second splicing groove 321 corresponding to the second splicing convex block 312 that restrict a lateral movement of the hand warm body. During splicing, the first splicing convex block 311 is embedded into the first splicing groove 321, the second splicing convex block 312 is embedded into the second splicing groove 322.

The first splicing surface 11 and the second splicing surface 21 each includes a main splicing surface and two secondary splicing surfaces arranged on both sides of the main splicing surface, i.e., a main splicing surface 11a of the first splicing surface, a left secondary splicing surface 11b of the first splicing surface, a right secondary splicing surface 11c of the first splicing surface, a main splicing surface 21a of the second splicing surface, a left secondary splicing surface 21b of the second splicing surface, and a right secondary splicing surface 21c of the second splicing surface; the main splicing surface of the first splicing surface is arranged to be an included angle relative to the secondary splicing surface of the first splicing surface; and the main splicing surface of the second splicing surface is arranged to be an included angle relative to the secondary splicing surface of the second splicing surface.

The difference between this embodiment and the Embodiment 5 is that both the left secondary splicing surface 11b of the first splicing surface and the left secondary splicing surface 21b of the second splicing surface are respectively provided with the first splicing convex block 311 and the second splicing convex block 312; the first splicing groove 321 and the second splicing groove 322 are respectively provided on the second splicing surface of the first splicing surface 11 and the second splicing surface of the second splicing surface 21. When splicing, the first splicing convex block 311 of the first hand warmer body 10 is inserted into the first splicing groove 321 of the second hand warmer body 20, the second splicing convex block 312 of the first hand warmer body 10 is inserted into the second splicing groove 322 of the second hand warmer body 20, and the first splicing convex block 311 of the second hand warmer body 20 is inserted into the first splicing groove 321 of the first hand warmer body 10, the second splicing convex block 312 of the second hand warmer body 20 is inserted into the second splicing groove 322 of the first hand warmer body 10.

By providing the first splicing convex block 311 that restricts the longitudinal movement of the hand warmer body and the second splicing groove 312 that restricts the lateral movement of the hand warmer body, it is also possible to achieve the assembly and separation of two hand warmer bodies.

A protruding direction of the first splicing convex block 311 is perpendicular to a protruding direction of the second splicing convex block 312. In this embodiment, a top of the second splicing convex block 312 has an arc-shaped guide surface, and the second splicing convex block 312 has elasticity.

The above is only a preferred embodiment of the present disclosure and is not intended to limit it. Therefore, any modifications, equivalent replacement, improvements, etc. made to the above embodiments based on the technical solution of the present disclosure still fall within the scope of the technical solution of the present disclosure.

What is claimed is:

1. A hand warmer, comprising two hand warmer bodies, i.e., a first hand warmer body and a second hand warmer body; the first hand warmer body is provided with a first splicing surface, the second hand warmer body is provided with a second splicing surface;
   a splicing mechanism is provided between the first splicing surface and the second splicing surface, the splicing mechanism comprises at least one splicing convex block provided on the first splicing surface and at least one splicing groove provided on the second splicing surface; the splicing convex block is interference-fit with the splicing groove;
   the splicing convex block of the first hand warmer body is embedded into the splicing groove of the second hand warmer body during splicing;
   wherein each of the first splicing surface and the second splicing surface comprises a main splicing surface and at least one secondary splicing surface, the splicing convex block is provided on the secondary splicing surface of the first splicing surface, and the splicing groove is provided on the secondary splicing surface of the second splicing surface, the main splicing surface of the first splicing surface is arranged to be an included angle relative to the secondary splicing surface of the first splicing surface; and the main splicing surface of the second splicing surface is arranged to be an included angle relative to the secondary splicing surface of the second splicing surface.

2. The hand warmer according to claim 1, wherein the splicing convex block has a shape of polygonal, and a shape of the splicing groove is adapted to the splicing convex block.

3. The hand warmer according to claim 2, wherein the splicing convex block has a shape of triangle.

4. The hand warmer according to claim 2, wherein the splicing convex block has a shape of hexagonal.

5. The hand warmer according to claim 4, wherein the splicing convex block on the first splicing surface comprises three first splicing convex blocks; the first splicing surface is further provided with three first splicing grooves; wherein each of the first splicing convex block is coplanar with a side surface of an adjacent first splicing groove at an adjacency position that the first splicing convex is adjacent to the adjacent first splicing groove;
   the splicing groove of the second splicing surface comprises three second splicing grooves; the second splicing surface is further provided with three second splicing convex blocks with hexagonal shapes; each of the second splicing convex block is coplanar with a side surface of an adjacent second splicing groove at an adjacency position that the second splicing convex block is adjacent to the adjacent second splicing groove;
   shapes of the three first splicing grooves are adapted to the three second splicing convex blocks; the three first splicing convex blocks are respectively embedded into the three second splicing grooves and the three second splicing convex blocks are respectively embedded into the three first splicing grooves during splicing.

6. The hand warmer according to claim 5, wherein the three first splicing convex blocks and three first splicing grooves are distributed along a same center circular, and the three first splicing convex blocks and the three first splicing grooves are surrounded one side facing a center to form a hexagonal shape; the three second splicing convex blocks and the three second splicing grooves are all distributed along a same center circular, and the three second splicing convex blocks and the three second splicing grooves are surrounded one side facing a center to form a hexagonal shape.

7. The hand warmer according to claim 1, where side surfaces of the splicing convex block and the splicing groove are both flat surfaces, or the side surfaces of the splicing convex block and the splicing groove are both curved surfaces.

8. The hand warmer according to claim 1, wherein the first splicing surface is further provided with at least one splicing groove, and the second splicing surface is further provided with at least one splicing convex block.

9. The hand warmer according to claim 1, wherein each of the first hand warmer body and the second hand warmer body comprises a shell, a heating component arranged inside the shell, a power supply, and a control circuit board.

10. The hand warmer according to claim 9, wherein the shell comprises an upper shell and a lower shell, an outer surface of the upper shell is an arc-shaped surface, the first splicing surface is a lower end face of the lower shell of the first hand warmer body, the second splicing surface is a lower end face of the lower shell of the second hand warmer body, and the first splicing surface and the second splicing surface are both flat surfaces.

11. The hand warmer according to claim 1, wherein there is a distance between the first splicing surface and the second splicing surface, and a height of the splicing convex block is greater than a depth of the splicing groove.

12. The hand warmer according to claim 1, wherein the first splicing surface and the second splicing surfaces are tightly fitted together, and the height of the splicing convex block is equal to or less than the depth of the splicing groove.

13. The hand warmer according to claim 1, wherein the splicing convex block is not vertically arranged with the main splicing surface of the first splicing surface.

14. The hand warmer according to claim 13, wherein a protruding direction of the splicing convex block is parallel to the main splicing surface of the first splicing surface.

15. The hand warmer according to claim 1, wherein the first splicing surface is provided with two secondary splicing surfaces respectively arranged on both sides of the main splicing surface of the first splicing surface, i.e., a left secondary splicing surface of the first splicing surface and a right secondary splicing surface of the first splicing surface; the second splicing surface is provided with two secondary splicing surfaces respectively arranged on both sides of the main splicing surface of the second splicing surface, i.e., a left secondary splicing surface of the second splicing surface and a right secondary splicing surface of the second splicing surface; wherein the left secondary splicing surface of the first splicing surface is provided with a splicing convex block, and the right secondary splicing surface of the second splicing surface is provided with a splicing groove.

16. A hand warmer, comprising two hand warmer bodies parts, i.e., a first hand warmer body and a second hand warmer body; the first hand warmer body is provided with a first splicing surface, the second hand warmer body is provided with a second splicing surface;
a splicing mechanism is provided between the first splicing surface and the second splicing surface, the splicing mechanism comprises at least one first splicing convex block and at least one first splicing groove that restrict a longitudinal movement of the first hand warmer body, at least one second splicing convex block and at least one splicing groove that restricts a lateral movement of the second hand warmer body;
the first splicing convex block is embedded into the first splicing groove, and the second splicing convex block is embedded into the second splicing groove during splicing;
wherein each of the first splicing surface and the second splicing surface comprises a main splicing surface and two secondary splicing surfaces arranged on both sides of the main splicing surface, i.e., a main splicing surface of the first splicing surface, a left secondary splicing surface of the first splicing surface, a right secondary splicing surface of the first splicing surface, a main splicing surface of the second splicing surface, a left secondary splicing surface of the second splicing surface, and a right secondary splicing surface of the second splicing surface;
the main splicing surface of the first splicing surface is arranged to be at an included angle relative to the secondary splicing surface of the first splicing surface, and the main splicing surface of the second splicing surface is arranged to be at an included angle relative to the secondary splicing surfaces of the second splicing surface.

17. The hand warmer according to claim 16, wherein the left secondary splicing surface of the first splicing surface and the left splicing surface of the second splicing surface are respectively provided with a first splicing convex block and a second splicing convex block;
the right secondary splicing surface of the first splicing surface and the right secondary splicing surface of the second splicing surface are respectively provided with a first splicing groove and a second splicing groove;
the first splicing convex block of the first hand warmer body is embedded in the first splicing groove of the second hand warmer body, the second splicing convex block of the first hand warmer body is embedded in the second splicing groove of the second hand warmer body, the first splicing convex block of the second hand warmer body is embedded in the first splicing groove of the first hand warmer body, and the second splicing convex block of the second hand warmer body is embedded into the second splicing groove of the first hand warmer body when splicing the hand warmer.

18. The hand warmer according to claim 17, wherein a top of the second splicing convex block has an arc-shaped guide surface.

19. The hand warmer according to claim 17, wherein a protruding direction of the first splicing convex block is perpendicular to a protruding direction of the second splicing convex block.

* * * * *